US 9,484,001 B2

(12) United States Patent
Dabhi

(10) Patent No.: US 9,484,001 B2
(45) Date of Patent: Nov. 1, 2016

(54) PORTABLE ELECTRONIC DEVICE CONTROLLING DIFFUSE LIGHT SOURCE TO EMIT LIGHT APPROXIMATING COLOR OF OBJECT OF USER INTEREST

(71) Applicant: Google Technology Holdings LLC, Mountain View, CA (US)

(72) Inventor: Navin T Dabhi, Fremont, CA (US)

(*) Notice: Subject to any disclaimer, the term of this patent is extended or adjusted under 35 U.S.C. 154(b) by 22 days.

(21) Appl. No.: 14/139,485

(22) Filed: Dec. 23, 2013

(65) Prior Publication Data
US 2015/0179141 A1 Jun. 25, 2015

(51) Int. Cl.
G09G 5/02 (2006.01)
G09G 3/14 (2006.01)
G09G 3/20 (2006.01)
G09G 3/34 (2006.01)
G06T 11/60 (2006.01)
H04N 1/60 (2006.01)
G06F 3/0481 (2013.01)
G09G 5/06 (2006.01)
G06F 3/0484 (2013.01)
G06F 3/0487 (2013.01)

(52) U.S. Cl.
CPC .............. *G09G 5/06* (2013.01); *G06F 3/0481* (2013.01); *G06F 3/0487* (2013.01); *G06F 3/04842* (2013.01)

(58) Field of Classification Search
CPC combination set(s) only.
See application file for complete search history.

(56) References Cited

U.S. PATENT DOCUMENTS

| 4,985,878 A | 1/1991 | Yamada et al. |
| 5,416,730 A | 5/1995 | Lookofsky |
| 5,479,285 A | 12/1995 | Burke |
| 5,625,697 A | 4/1997 | Bowen et al. |
| 5,872,744 A | 2/1999 | Taylor |
| 5,889,737 A | 3/1999 | Alameh et al. |
| 6,158,884 A | 12/2000 | Lebby et al. |
| 6,382,448 B1 | 5/2002 | Yuhara et al. |
| 6,528,203 B1 | 3/2003 | Mitamura |
| 6,532,152 B1 | 3/2003 | White et al. |

(Continued)

FOREIGN PATENT DOCUMENTS

| DE | 102009003128 | 11/2010 |
| EP | 1225751 | 7/2002 |

(Continued)

OTHER PUBLICATIONS

"Final Office Action", U.S. Appl. No. 13/455,921, Jun. 13, 2014, 18 pages.

(Continued)

*Primary Examiner* — Wesner Sajous
(74) *Attorney, Agent, or Firm* — Wolfe-SBMC

(57) ABSTRACT

A trigger event causes a portable electronic device to capture an image of an object in which a user has expressed interest. The trigger event can be an express command or an implied, or inferred, indication of the user's interest in the object. With an image of the object captured, the portable electronic device determines a predominant color, and controls one or more diffuse light sources associated with the portable electronic device to emit light that approximates the determined color. The one or more diffused light sources controlled in this manner can include multi-color light emitting elements located at a housing of the portable electronic device, multi-color light emitting elements located at a case accessory of the portable electronic device (e.g., a case cover, holster, etc.), or a combination thereof.

22 Claims, 5 Drawing Sheets

(56) References Cited

U.S. PATENT DOCUMENTS

| | | |
|---|---|---|
| 6,771,237 B1 | 8/2004 | Kalt |
| 7,224,963 B2 | 5/2007 | Anderson et al. |
| 7,259,155 B2 | 8/2007 | Sakai et al. |
| 7,401,758 B2 | 7/2008 | Liang et al. |
| 7,623,780 B2 * | 11/2009 | Takita ............... G03B 15/03 396/155 |
| 7,766,517 B2 | 8/2010 | Kerr et al. |
| 7,953,463 B2 | 5/2011 | Misawa |
| 8,207,936 B2 | 6/2012 | Gustafsson et al. |
| 8,359,020 B2 | 1/2013 | Lebeau et al. |
| 8,456,586 B2 | 6/2013 | Mathew et al. |
| 8,517,896 B2 | 8/2013 | Robinette et al. |
| 8,675,124 B2 * | 3/2014 | Kawakami ............ G03B 15/05 348/223.1 |
| 9,009,984 B2 | 4/2015 | Caskey et al. |
| 9,201,454 B2 | 12/2015 | Haupt et al. |
| 2002/0103014 A1 | 8/2002 | Hutchison et al. |
| 2003/0158593 A1 | 8/2003 | Heilman et al. |
| 2004/0056845 A1 | 3/2004 | Harkcom et al. |
| 2004/0250933 A1 | 12/2004 | DeMichele |
| 2005/0285811 A1 | 12/2005 | Kawase et al. |
| 2007/0103908 A1 | 5/2007 | Tabito et al. |
| 2007/0273609 A1 | 11/2007 | Yamaguchi et al. |
| 2008/0001971 A1 * | 1/2008 | Kouninski ............... G09G 3/20 345/635 |
| 2008/0074551 A1 * | 3/2008 | Kawakami ............ G03B 15/05 348/655 |
| 2008/0094515 A1 * | 4/2008 | Gutta ................... H05B 37/029 348/602 |
| 2008/0204367 A1 | 8/2008 | LaFarre et al. |
| 2008/0285290 A1 | 11/2008 | Ohashi et al. |
| 2008/0291225 A1 | 11/2008 | Arneson |
| 2008/0303782 A1 | 12/2008 | Grant et al. |
| 2008/0309589 A1 | 12/2008 | Morales |
| 2008/0309861 A1 | 12/2008 | Seki et al. |
| 2009/0195959 A1 | 8/2009 | Ladouceur et al. |
| 2009/0254869 A1 | 10/2009 | Ludwig et al. |
| 2010/0053174 A1 | 3/2010 | Cohen et al. |
| 2010/0056223 A1 | 3/2010 | Choi et al. |
| 2010/0225600 A1 | 9/2010 | Dai et al. |
| 2010/0231692 A1 * | 9/2010 | Perlman et al. ................. 348/48 |
| 2010/0238367 A1 | 9/2010 | Montgomery et al. |
| 2010/0265431 A1 | 10/2010 | Li |
| 2010/0328571 A1 | 12/2010 | Itaya |
| 2011/0109538 A1 | 5/2011 | Kerr et al. |
| 2011/0221656 A1 | 9/2011 | Haddick et al. |
| 2011/0242750 A1 | 10/2011 | Oakley |
| 2011/0255303 A1 | 10/2011 | Nichol et al. |
| 2012/0038613 A1 | 2/2012 | Choi |
| 2012/0044131 A1 | 2/2012 | Nussbacher et al. |
| 2012/0055553 A1 | 3/2012 | Logunov et al. |
| 2012/0091923 A1 | 4/2012 | Kastner-Jung et al. |
| 2012/0112994 A1 | 5/2012 | Vertegaal et al. |
| 2012/0177953 A1 | 7/2012 | Bhardwaj et al. |
| 2012/0242592 A1 | 9/2012 | Rothkopf et al. |
| 2013/0053661 A1 | 2/2013 | Alberth et al. |
| 2013/0076649 A1 | 3/2013 | Myers et al. |
| 2013/0127733 A1 | 5/2013 | Krishnaswamy |
| 2013/0278631 A1 * | 10/2013 | Border et al. ................. 345/633 |
| 2013/0307419 A1 * | 11/2013 | Simonian ........... H05B 33/0869 315/153 |
| 2013/0329460 A1 | 12/2013 | Mathew et al. |
| 2014/0063049 A1 * | 3/2014 | Armstrong-Muntner ..... 345/619 |
| 2014/0063055 A1 * | 3/2014 | Osterhout et al. ............ 345/633 |
| 2014/0240903 A1 | 8/2014 | Allore et al. |
| 2014/0265821 A1 | 9/2014 | Malon |
| 2014/0285967 A1 | 9/2014 | Wikander et al. |
| 2014/0368981 A1 | 12/2014 | Haupt et al. |
| 2014/0372940 A1 | 12/2014 | Cauwels et al. |
| 2015/0138505 A1 * | 5/2015 | Grenon ................. A61B 3/101 351/206 |

FOREIGN PATENT DOCUMENTS

| | | |
|---|---|---|
| EP | 2500898 | 9/2012 |
| GB | 2327012 | 1/1999 |
| WO | WO-9624093 | 8/1996 |
| WO | WO-0025193 | 5/2000 |
| WO | WO-2008057143 | 5/2008 |
| WO | WO-2011121403 | 10/2011 |

OTHER PUBLICATIONS

"Final Office Action", U.S. Appl. No. 13/455,921, Oct. 7, 2015, 19 pages.

"Final Office Action", U.S. Appl. No. 13/893,533, Jul. 30, 2015, 15 pages.

"International Preliminary Report on Patentability", Application No. PCT/US2013/034760, Nov. 6, 2014, 10 pages.

"International Search Report and Written Opinion", Application No. PCT/US2014/012739, May 9, 2014, 11 pages.

"International Search Report and Written Opinion", Application No. PCT/US2013/034760, Jun. 28, 2013, 13 pages.

"International Search Report and Written Opinion", Application No. PCT/US2012/064300, Apr. 11, 2013, 14 pages.

"International Search Report and Written Opinion", Application No. PCT/US2014/017331, Sep. 1, 2014, 15 pages.

"Non-Final Office Action", U.S. Appl. No. 13/297,662, Jun. 2, 2014, 12 pages.

"Non-Final Office Action", U.S. Appl. No. 13/455,921, Feb. 24, 2015, 17 pages.

"Non-Final Office Action", U.S. Appl. No. 13/455,921, Dec. 18, 2013, 15 pages.

"Non-Final Office Action", U.S. Appl. No. 13/893,533, Mar. 2, 2015, 14 pages.

"Non-Final Office Action", U.S. Appl. No. 13/893,533, Dec. 18, 2015, 22 pages.

"Non-Final Office Action", U.S. Appl. No. 14/474,808, Jan. 12, 2016, 9 pages.

"Notice of Allowance", U.S. Appl. No. 14/082,733, Feb. 18, 2015, 7 pages.

"Notice of Allowance", U.S. Appl. No. 14/082,733, Jul. 27, 2015, 7 pages.

"Restriction Requirement", U.S. Appl. No. 13/297,662, Nov. 14, 2013, 5 pages.

"Restriction Requirement", U.S. Appl. No. 14/034,860, Sep. 4, 2015, 11 pages.

Kee,"Bendable batteries in the pipeline?", Ubergizmo, http://www.ubergizmo.com/2011/02/bendable-batteries-in-the-pipeline/, Feb. 28, 2011, 2 pages.

Tan,"Exploiting the Cognitive and Social Benefits of Physically Large Displays", Carnegie Mellon University CMU-CS-04-154, Aug. 2004, 201 pages.

"Final Office Action", U.S. Appl. No. 14/034,860, Jun. 27, 20216, 10 pages.

"Final Office Action", U.S. Appl. No. 14/474,808, Jun. 2, 2016, 15 pages.

"Final Office Action", U.S. Appl. No. 13/893,533, May 5, 2016, 22 pages.

Advisory Action, U.S. Appl. No. 14/474,808, Sep. 19, 2016, 2 pages.

Advisory Action, U.S. Appl. No. 13/893,533, Sep. 14, 2016, 3 pages.

* cited by examiner

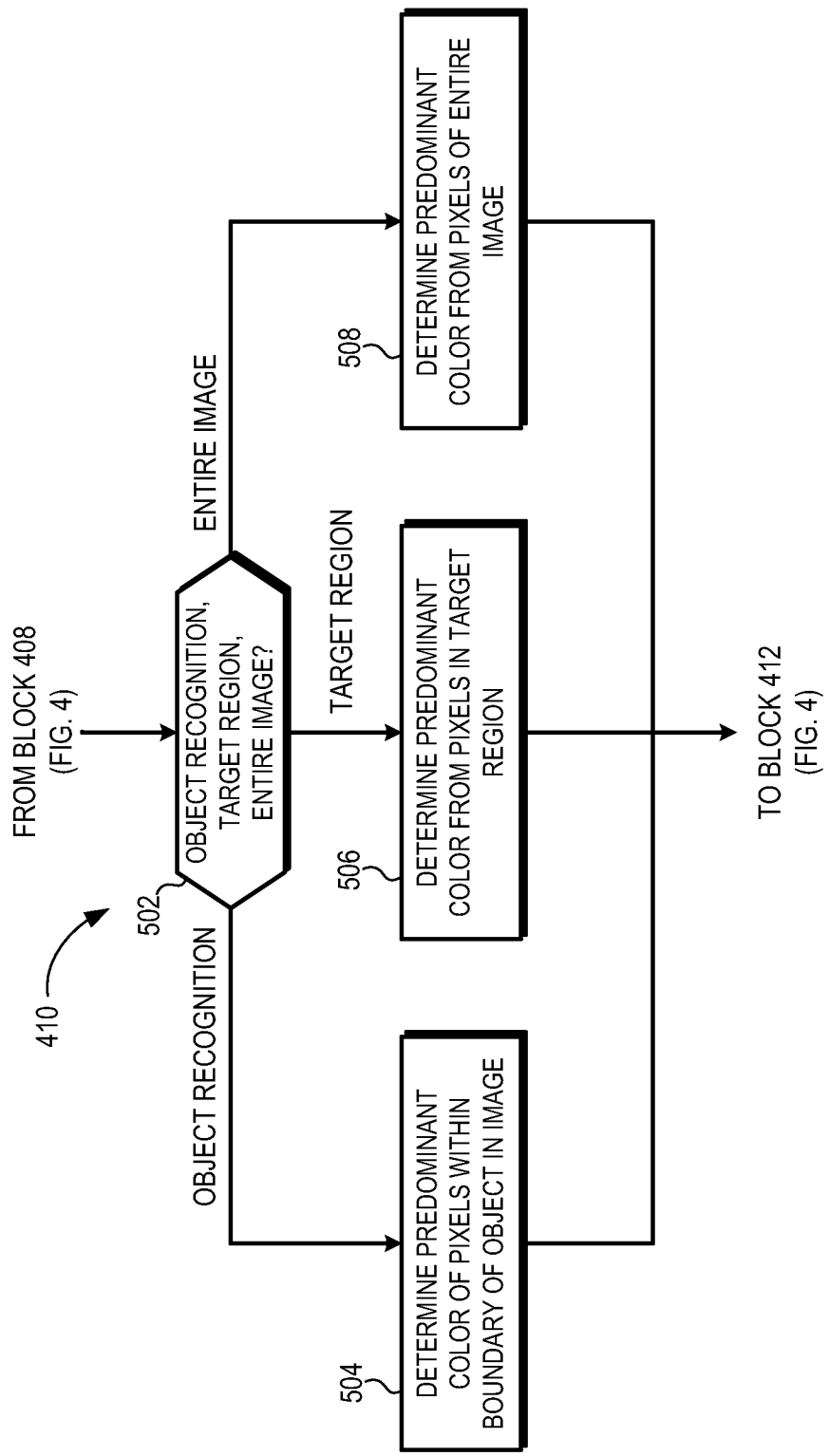

PORTABLE ELECTRONIC DEVICE CONTROLLING DIFFUSE LIGHT SOURCE TO EMIT LIGHT APPROXIMATING COLOR OF OBJECT OF USER INTEREST

FIELD OF THE DISCLOSURE

The present disclosure relates generally to portable electronic devices and more particularly to user customization of portable electronic devices.

BACKGROUND

Users of cellular phones, tablets, and other portable electronic devices frequently are interested in customizing the appearance of their portable electronic devices so that they reflect the users' personalities and interests. Typically, such customizations have been limited to selection of a device case with a particular print, pattern, or logo, the selection of a particular photograph as the background image on the display screen of the portable electronic device, or the selection of pre-defined themes for the display screen of the portable electronic device. These conventional customizations often do not provide users with a sufficient sense of individuality that they often seek from their devices.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

FIG. 5 is a flow diagram illustrating an example method for determining a color associated with an object of interest from a captured image in accordance with at least one embodiment of the present disclosure.

DETAILED DESCRIPTION

Figure 1:
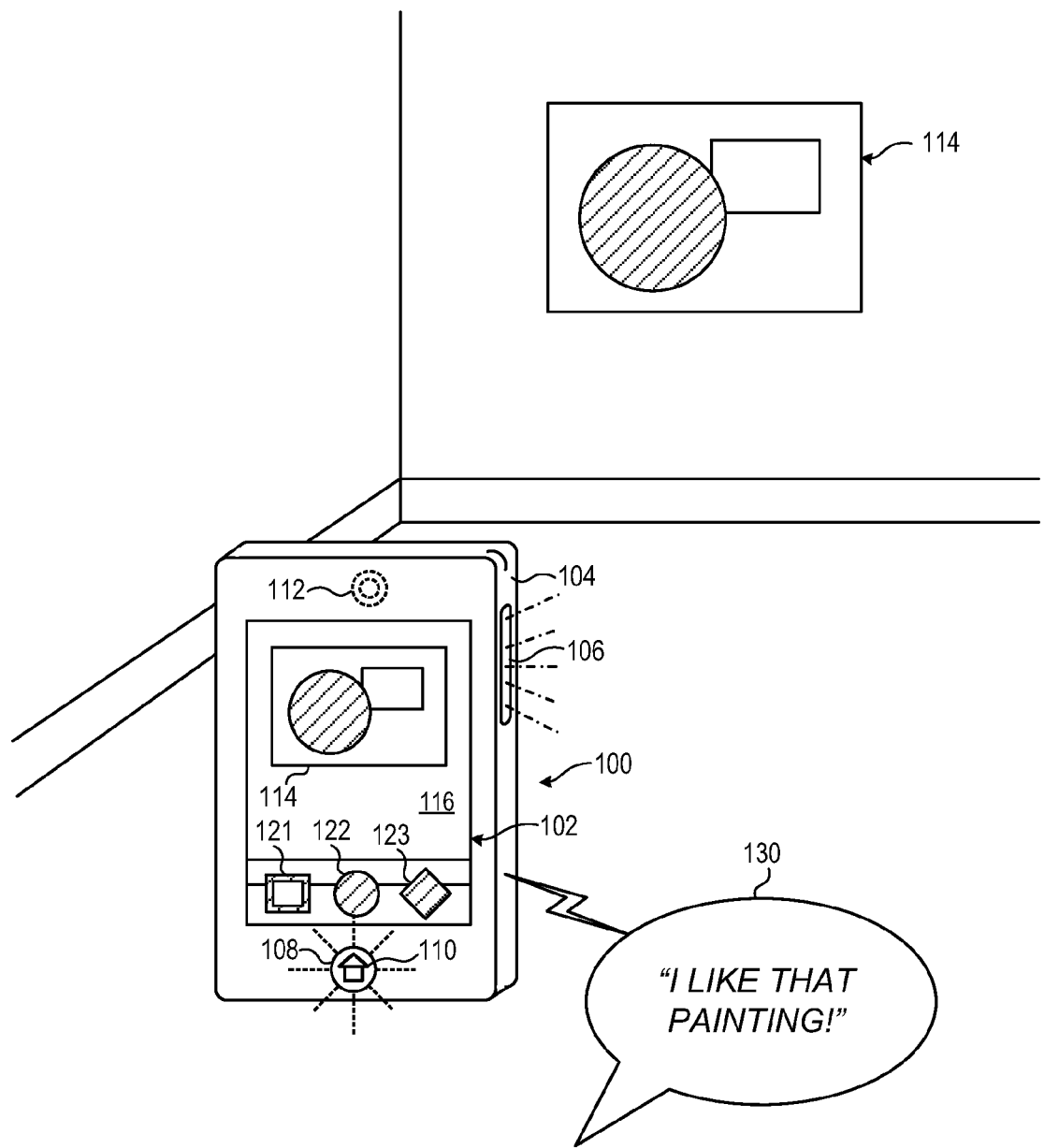
FIG. 1 is a diagram illustrating a portable electronic device operable to emit diffused light approximating a color of an object of interest to a user in accordance with at least one embodiment of the present disclosure.

The following description is intended to convey a thorough understanding of the present disclosure by providing a number of specific embodiments and details involving customization of a color scheme of a portable electronic device by configuring one or more diffused light sources of the portable electronic device or an associated holster, cover, or other case accessory. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-5 illustrate example techniques for customization of a color scheme of a portable electronic device through control of one or more diffuse light sources associated with the portable electronic device. In at least one embodiment, a trigger event causes the portable electronic device to capture an image of an object in the local environment and for which a user has expressed affinity or otherwise expressed an interest in the object. The trigger event can be an express command, such as a user's voice command or a user's manipulation of a button or other user interface of the portable electronic device, or the trigger event can be an implied, or inferred, indication of the user's interest in the object, such as may be obtained through analysis of the user's speech or other vocalizations, or from analysis of other activities or usage patterns of the user.

With an image of the object captured, the predominant color of the object, or another color associated with the object, is determined, and one or more diffuse light sources associated with the portable electronic device are configured to emit light that approximates the determined color. In some embodiments, the portable electronic device performs one or both of the identification of the object within the image and the determination of the color of the object, while in other embodiments, the portable electronic device communicates with a remote processing system, which performs one or both of the processes of identifying the object and determining the color associated with the object. The one or more diffused light sources controlled in this manner can include multi-color light emitting elements (e.g., light emitting diodes) disposed at a housing of the portable electronic device, multi-color light emitting elements disposed at a case accessory of the portable electronic device (e.g., a case cover, holster, etc.), or a combination thereof. In some embodiments, the color of the object also can be used to configure a color scheme of a graphical user interface (GUI) presented via a display screen of the portable electronic device.

By directly or indirectly expressing an affinity or other interest in an object in the user's proximity or local environment, the user can configure the portable electronic device or associated case accessory to emit diffused light that approximates the color of the object of interest, and thus the portable electronic device or associated case accessory can provide "mood lighting" or other color scheme that is individualized to the user's tastes or preferences. Additionally, in some embodiments, to facilitate color scheme coordination in a group of devices, the portable electronic device can transmit an indicator to other portable electronic devices of a specified group so that these other portable electronic devices can likewise configure their diffuse light sources to emit light having the same or similar hue.

FIG. 1 illustrates a portable electronic device 100 employing customized diffused light color scheme control in accordance with at least one embodiment of the present disclosure. The portable electronic device 100 can include any of a variety of battery-powered or capacitor-powered and handheld or otherwise user-portable devices, such as a computing-enabled cellular phone ("smartphone"), a computing-enabled watch ("smartwatch"), a tablet computer, notebook computer, a handheld gaming console, a personal digital assistant (PDA), and the like. The portable electronic device 100 may be associated with a case accessory (not shown in FIG. 1), such as a holster for carrying the portable electronic device 100, a screen cover for the portable electronic device 100, a protective case for the portable electronic device 100, or a detachable keyboard for the portable electronic device 100. In such instances, the portable electronic device 100 may be communicatively coupled to the case accessory via a wired connection, such as a universal serial bus (USB) or Lightning™ cable, or via a wireless connection, such as a Bluetooth™, wireless local area network (WLAN), or ZigBee™ connection.

In the depicted example, the portable electronic device 100 includes a display screen 102 and one or more diffused light sources disposed at a housing 104, such as a diffused light source 106 disposed at a side panel of the housing 104, and a diffused light source 108 disposed at the front panel of the housing 104 and which serves as backlighting for a "hard" or "physical" button 110 on the front panel. The portable electronic device 100 further is associated with an imaging camera 112, which in the illustrated embodiment is disposed at a back panel of the portable electronic device 100 and thus integrated into the portable electronic device 100. In other embodiments, the imaging camera 112 can include an imaging camera separate from, but wirelessly connected to, the portable electronic device 100. To illustrate, the portable electronic device 100 can include a smartphone or a tablet computer, and the imaging camera 112 may be integrated into a smartwatch, a head-mounted display device (e.g., Google™ Glass™), or other user-wearable device that communicates with the smartphone or tablet computer.

In operation, the portable electronic device 100 monitors the user's interactions or other user activities to detect a trigger event that signals a user's interest in an object in proximity to the portable electronic device 100. In some embodiments, the trigger event occurs in the form of an explicit instruction, such as when a user uses an imaging application of the portable electronic device 100 to initiate the capture of an image of the object via the imaging camera 112 with the intent to use a color of the object to configure the diffused light sources 106 and 108 accordingly. This explicit command may come in the form of a user's manipulation of a physical button on the housing 104 or manipulation of a "soft" button presented on the display screen 102, or in the user's vocalization of a verbal command to the imaging software, such as the user speaking the command "capture image for custom housing color" into a microphone of the portable electronic device 100. In other embodiments, the trigger event occurs in the form of an inference that the user is interested in the object. To illustrate, the portable electronic device 100 may monitor the user's vocalizations 130 to detect terms or phrasing indicating an interest in an object in the local environment, such as the user exclaiming "I like that painting!". The portable electronic device 100 also may infer interest in the object from a usage pattern or user interactions with the portable electronic device 100. As an example, if the user handles the portable electronic device 100 such that the object remains in an imaging viewfinder of the portable electronic device 100 for longer than a threshold duration, the portable electronic device 100 may infer the user's interest in the object.

In response to the trigger event, the portable electronic device 100 obtains an image of the object. In some embodiments, the trigger event and the image capture are tightly coupled—that is, the image capture serves as part of the trigger event. To illustrate, the trigger event may be the user's manipulation of a button to capture the image of the object, and thus it is presumed that the object is present in the captured image. In other embodiments, the portable electronic device 100 may have to capture one or more images of the local environment in response to the trigger event, and the one or more images are then analyzed to identify the presence of the object in at least one of the captured images. This analysis may be performed at the portable electronic device 100, or the portable electronic device 100 may transmit one or more of the captured images and one or more descriptors of the object to a remote processing system (not shown in FIG. 1) for this analysis.

With the presence of the object presumed or confirmed in the captured image, the portable electronic device 100 or the remote processing system then determines from the image(s) a predominant color of the object or other color associated with the object. This color may include, for example, a mean color or median color of the entire image containing the object. Alternatively, the color may include a mean color or median color of a certain region of the image. For example, under the assumption that users typically attempt to center a picture or captured image around an object of interest, the predominant color of a target region centered around a center point of the image may be used to determine the color associated with the object. In the event that the border of the object in the image is known or can be determined, the color can be determined as the predominant color of the pixels within this border (that is, the predominant color of the region of the image that represents the object). This color extraction process may be performed at the portable electronic device 100, or the image may be provided to a remote processing system for the color extraction process, such as in conjunction with the object recognition process described above.

With the color identified, the portable electronic device 100 configures one or more of the diffused light sources 106 and 108 to emit light approximating this color. In some embodiments, the diffused light sources 106 and 108 include LEDs of different colors, and the portable electronic device 100 controls the intensity of each LED so that the different colored lights emitted by the LEDs through a diffuser results in the emission of mixed light having the intended hue. In implementations whereby a diffused light source is located on a case accessory, the portable electronic device 100 may transmit an indicator of the color to the case accessory, which then may control its diffused light source to emit light having the indicated color.

This process may be illustrated using the example presented in FIG. 1, in which the portable user device 100 faces a wall upon which a painting 114 is mounted. In response to the user exclaiming "I like that painting!" (vocalization 130), the portable electronic device 100 captures multiple images of the local environment from different perspective views, including an image 116, and then the portable electronic device 100 transmits the multiple images and an object descriptor "<painting>" to a remote processing system.

The remote processing system performs an object recognition process to identify the presence of the painting 114 in the image 116, as well as the set of pixels of the image 116 that represents the painting 114. The remote processing system then analyzes the colors of the pixels of this set to identify a predominant color of the painting 114, which in this example is the color of a circle present in the painting 114 (this predominant color being indicated as hatched fill in FIG. 1). The remote processing system determines the value or other identifier representative of this color, such as the Hypertext Markup Language (HTML) code value for the color, a red/blue/green (RGB) identifier from an RGB color model, a hue/saturation/lightness (HSL) value, a Pantone™ color value, and the like. The color identifier is then transmitted to portable electronic device 100, which then controls the diffused light sources 106 and 108 to emit light approximating the color identified by the received color identifier. The process of detecting the presence of the painting 114 in the image 116 or the predominant color of the painting 114 in the image 116 instead may be performed by the portable electronic device 100.

As a variation of this example, the user instead may open a software application that provides this customization feature, and the user then manipulates the portable electronic device 100 (or the imaging camera 112 if it is separate) such that the painting 114 is maintained within a target region of a viewfinder presented on the display screen 102 for sufficient time for the software application to register the painting 114 as an object of interest, and from this determine the average color of the pixels with the target region as the color associated with the painting 114, and thus configure the diffused light sources 106 and 108 to emit light approximating this color accordingly.

In addition to configuring the particular quality of light emitted by the diffused light sources 106 and 108, the portable electronic device 100 further can customize one or more aspects of a graphical user interface (GUI) presented via the display screen 102 based on the color associated with the object of interest. To illustrate, many operating systems and applications utilize color themes for their GUIs, and such color themes may be configured so as to incorporate the color associated with the object of interest as a primary color or accent color of the color theme for the GUI. Using the example described above, when the color of the painting 114 is determined, the portable electronic device 100 can configure the color scheme of the GUI of the operating system such that the buttons, icons, window, backgrounds, and other graphical features of the GUI, such as icons 121, 122, and 123, incorporate the color of the painting 114 into their on-screen graphical representations.

Figure 2:
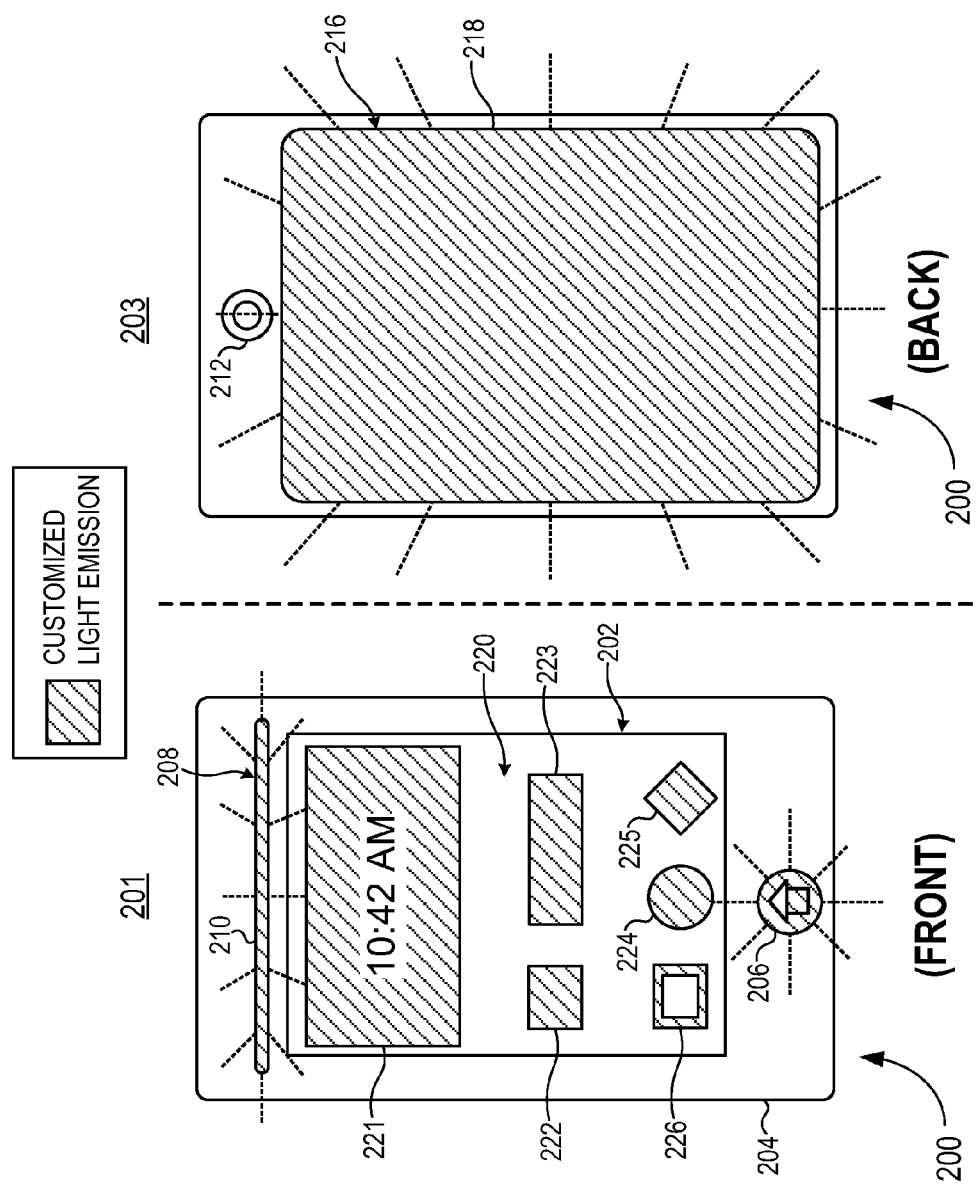
FIG. 2 is a diagram illustrating example front and back views of the portable electronic device of FIG. 1 in accordance with at least one embodiment of the present disclosure.

FIG. 2 illustrates an example front view 201 and back view 203 of a portable electronic device 200 having one or more diffused light sources in accordance with at least one embodiment of the present disclosure. The portable electronic device 200 illustrates one example implementation of the portable electronic device 100 of FIG. 1. Although FIG. 2 depicts a particular example implementation of diffused light sources at a portable electronic device, other diffused light source configurations may be implemented using the teachings provided herein.

As depicted in the front view 201, the front surface of the portable electronic device 200 includes a display screen 202 disposed in a housing 204. The front surface further includes a "home" physical button 206 and a forward-facing diffused light source 208. In the illustrated example, the forward-facing diffused light source 208 includes a diffuser 210 extending across the front face above the display screen 202, whereby the diffuser 210 includes a diffusing lens, diffusing film, diffusing panel, or other diffusing structure to diffuse and mix light emitted by LEDs disposed underneath the diffuser 210 such that the light emitted through the diffuser 210 is substantially uniform in color. Likewise, the "home" physical button 206 incorporates a light diffuser as part of the physical button component, as a ring surrounding the physical button component, and the like. Similarly, as depicted in the back view 203, the back surface of the portable electronic device 200 includes an imaging camera 212 (one embodiment of the imaging camera 112 of FIG. 1) and a rear-facing diffused light source 216. As with the forward-facing diffused light source 208, the rear-facing diffused light source 216 includes a diffuser 218 to diffuse and mix light emitted by one or more LEDs disposed underneath the diffuser 218. In the illustrated example, the diffuser 218 extends to cover a significant portion of the back surface of the portable electronic device 200. Although not illustrated FIG. 2, diffused light sources also may be implemented at one or more of the top, bottom, and side surfaces.

As illustrated in the display screen 202 in the front view 201, the portable electronic device 200 may execute an operating system or software application that provides a GUI 220 that incorporates various graphical features that are colored or otherwise represented in accordance with a specified color scheme, which may specify one or more primary colors and one or more detail or accent colors. To illustrate, the GUI 220 may include a clock "widget" 221 and icons 222, 223, 224, and 225 that employ a primary color of the color scheme as their background colors, and an icon 226 that employs a primary color of the color scheme as a border or other accent.

As similarly described above, the portable electronic device 200 can employ customized diffused light color scheme control so that one or more diffused light sources, such as the physical button 206, the forward-facing diffused light source 208, and the rear-facing diffused light source 216, emit light approximating a color of an object of interest. Further, the portable electronic device 200 can customize the color theme of the GUI 220 so that one or more primary colors or one or more accent colors of the color theme approximate the color of the object of interest, thereby customizing the appearance of, for example, the clock widget 221 and the icons 222, 223, 224, 225, and 226 to match the object of interest.

Figure 3:
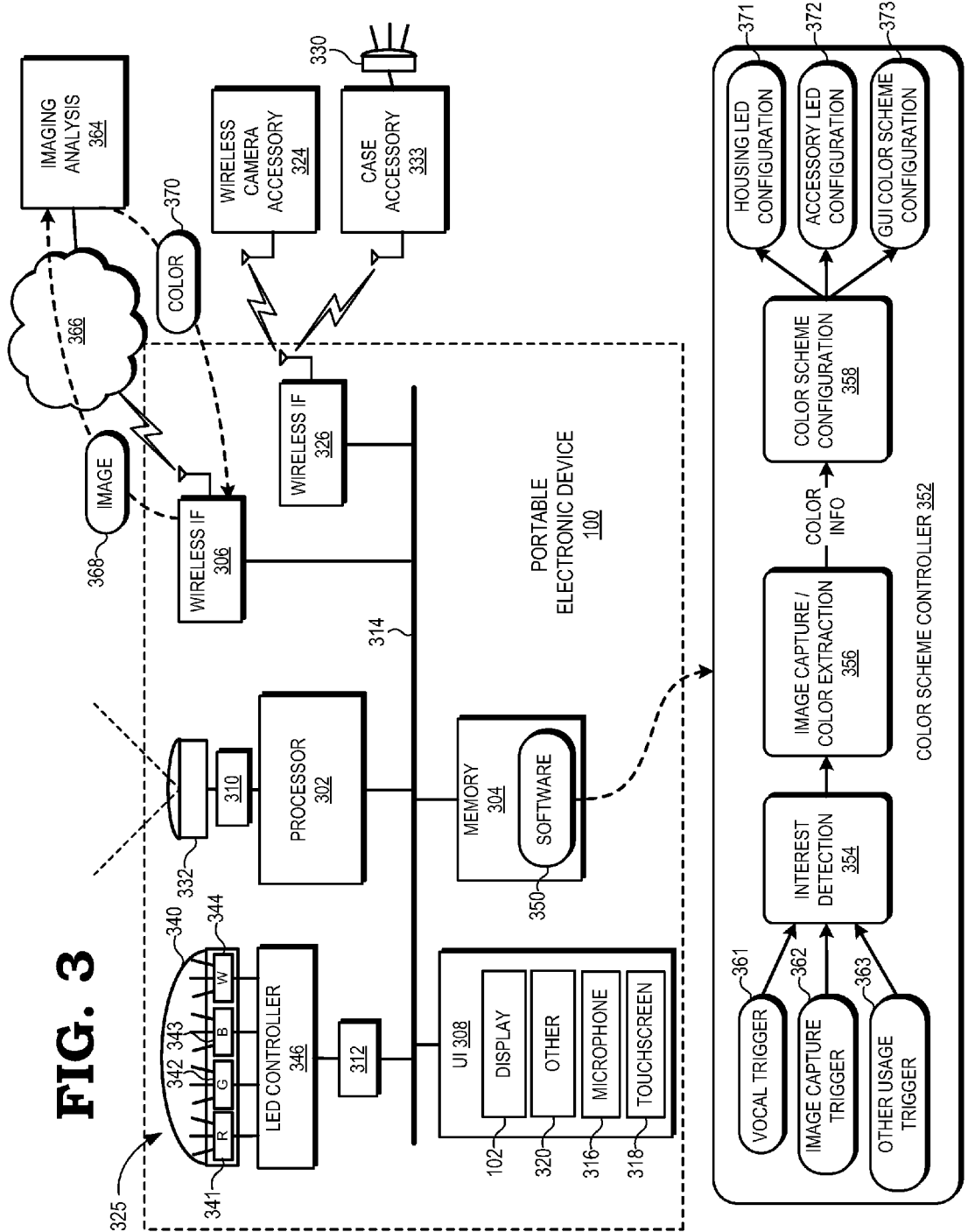
FIG. 3 is a diagram illustrating an example system implementation of the portable electronic device of FIG. 1 in accordance with at least one embodiment of the present disclosure.

FIG. 3 illustrates an example implementation of the portable electronic device 100 in accordance with at least one embodiment of the present disclosure. In the depicted example, the portable electronic device 100 includes at least one processor 302 (e.g., a central processing device (CPU)), one or more non-transitory computer readable storage media, such as system memory 304 or another storage device (e.g., flash memory, optical or magnetic disc drive, solid state hard drive, etc.), a wireless network interface 306 (e.g., a wireless local area network (WAN) interface, a cellular data network interface, etc.), a user interface (UI) 308, a camera interface 310, and one or more diffused light source interfaces 312 interconnected via one or more busses 314 or other interconnects. The UI 308 includes, for example, the display screen 102, a microphone 316, a keypad or touchscreen 318, as well as other input/output components 320 to receive input from, or provide information to, a user.

The camera interface 310 is coupleable to the imaging camera 112. In implementations whereby the imaging camera 112 is implemented as part of the portable electronic device 100 (as illustrated by integrated imaging camera 322), the camera interface 310 may be implemented as, for example, a wired bus or other wired interconnect coupling the integrated imaging camera 332 to the processor 302 or other component. In implementations whereby the imaging camera 112 is implemented as a separate imaging camera (as illustrated by wireless camera accessory 324), the camera interface 310 can include, for example, a wireless personal area network (PAN) wireless interface 326 of the portable electronic device 100, whereby the PAN wireless interface 326 wirelessly couples to the wireless camera accessory 324 using one or more PAN protocols. To illustrate, the wireless camera accessory 324 can include, for example, a wireless camera device that may be clipped onto a user's clothing or a camera-enabled smartwatch. The PAN wireless interface 326 thus may include, for example, a Bluetooth™ wireless interface, a ZigBee™ wireless interface, a wireless USB interface, and the like.

The diffused light source interface 312 is coupleable to one or more diffused light sources associated with the portable electronic device 100. In implementations whereby a diffused light sources is disposed at the housing 104 (FIG. 1) or otherwise integrated with the portable electronic device 100, such as the diffused light source 325 of FIG. 3, the diffused light source interface 312 may include, for example, a wired bus or other wired interconnect. In implementations whereby the diffused light sources include a diffused light source 330 implemented at a case accessory 333 for the portable electronic device 100, the diffused light source interface 312 for this diffused light source 330 can include, for example, the PAN wireless interface 326 in wireless communication with the case accessory 333.

The diffused light source 325 represents an example configuration of the one or more diffused light sources integrated at the portable electronic device 100. The diffused light source 330 at the case accessory 333 may be similarly configured. The diffused light source 325 includes a diffuser 340 overlying a plurality of LEDs or other light emitting devices, such as LEDs 341, 342, 343, and 344, and a LED controller 346. Each of the LEDs 341, 342, 343, and 344 emits light having a different dominant wavelength. For example, the LED 341 is implemented as a red (R) LED primarily emitting red light, the LED 342 is implemented as a green (G) LED primarily emitting green light, the LED 343 is implemented as a blue (B) LED primarily emitting blue light, and the LED 344 is implemented as a white (W) LED emitting broad-spectrum light. Other color combinations may be implemented, and the diffused light source 325 may implement more than one LED of any particular color or wavelength of light. To illustrate, for diffused light sources having relatively large diffusers, such as the rear-facing diffused light source 216 of FIG. 2, the underlying LEDs may be implemented as an array of LEDs of alternating colors. The diffuser 340 can be implemented as diffusing lense, film, plate, or other component that operates to mix and diffuse the different colored light emitted by the underlying LEDs so that the resulting diffused light emitted by the diffuser 340 appears as a substantially uniform color that is based on the particular intensity of colored light emitted by each of the different color LEDs. In some embodiments the diffuser 340 may employ a waveguide to route the light from the LEDs to another location of the housing before emitting the mixed and diffused light.

The LED controller 346 receives data indicating the intensities intended for the LEDs, and sends a corresponding signal to each LED in accordance with the intended intensities. The diffuser 340 mixes the emitted light to generate an output diffused light of substantially uniform color, whereby the particular color of the diffused light is based on the intensity of each corresponding input colored light. To illustrate, to emit a light having a particular color, the LED controller 346 may receive an RGB value that indicates a separate intensity for each of the red color component, green color component, and blue color component. From this RGB value, the LED controller 346 may provide signals with different current levels or pulse width modulation (PWM) signals of different duty cycles so that the red LED 341, green LED 342, and blue LED 343 each emits its respective color light with the intended intensity, such that when combined or mixed by the diffuser 340, results in diffused light having the intended color.

In operation, the processor 302 executes a set of executable instructions stored at a computer readable storage medium, such as the system memory 304 or flash memory, whereby the set of executable instructions represent one or more software applications 350. The software application 350, when executed, manipulates the processor 302 to perform various software-based functionality to implement at least a portion of the techniques described herein, provide visual information via the display 102, respond to user input via the touchscreen 318 and other user input devices, and the like.

In the illustrated example, the software application 350 implements a color scheme controller 352 that provides diffused light customization features as described herein. To this end, the color scheme controller 352 includes an interest detection module 354, an image capture/color extraction module 356 (hereinafter, "color extraction module 356"), and a color scheme configuration module 358. Although embodiments of the color scheme controller 352 as one or more processors 302 executing software application 350 are described herein, in other embodiments, the color scheme controller 352 may be implemented in hard-coded logic, or as a combination of hard-coded logic and one or more processors 302 executing software application 350. For example, one or more modules of the color scheme controller 352 may be implemented as an application specific integrated circuit (ASIC), a field programmable gate array (FPGA), and the like.

Figure 4:
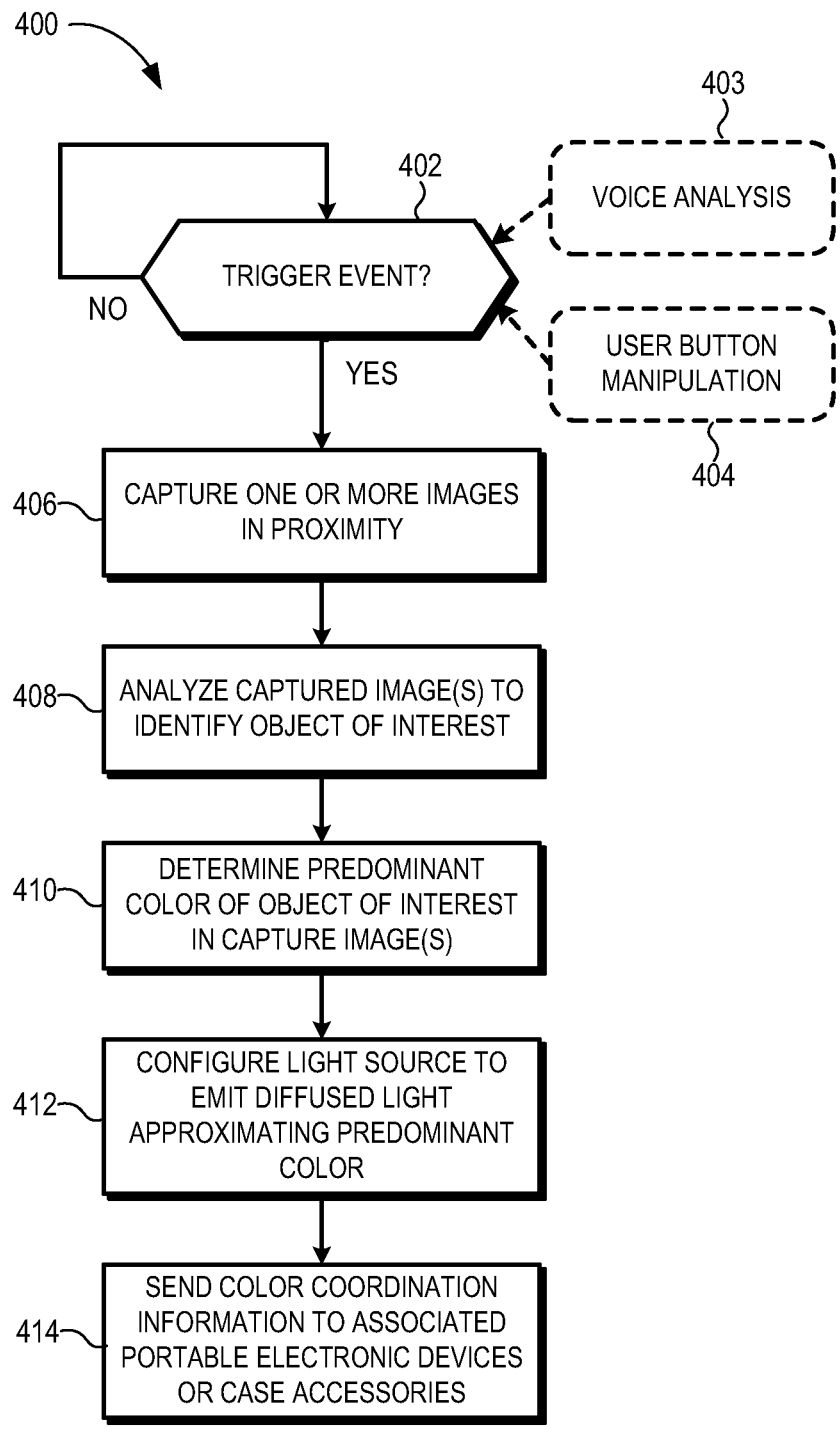
FIG. 4 is a flow diagram illustrating an example method for customizing a color theme associated with a portable electronic device based on an object of interest in accordance with at least one embodiment of the present disclosure.

FIG. 4 illustrates an example method 400 of operation of the color scheme controller 352 for customization of a color scheme of the portable electronic device 100 based on an object of interest in accordance with at least one embodiment of the present disclosure. The method 400 initiates at block 402, whereby the interest detection module 354 monitors user input to detect a trigger event indicative of the user's interest in an object in the local environment. The interest detection module 354 can determine interest in an object based on, for example, voice analysis 403 of the user's speech and other vocalizations via the microphone 316 (FIG. 3), resulting in a vocal trigger event 361 (FIG. 3). The interest detection module 354 also can determine interest in an object based on user button manipulation 404 or other usage of the portable electronic device 100. For example, the user may use an imaging application to capture an image of an object, and this image capture is thus interpreted as an image capture trigger event 362 (FIG. 3). The usage of the portable electronic device for non-imaging purposes also may result in an other-usage trigger event 363 (FIG. 3), such as the user using the touchscreen 318 to type a word or phrase indicating an interest in an object, or an analysis of usage patterns that indicate a user has taken interest in an object, such as the selection of a texting application directly following the capture of an image or maintaining a view finder in an image capture application on the object for more than a specified threshold duration.

In response to detecting the trigger event, at block 406 the color extraction module 356 operates to obtain one or more images of the object of interest using the imaging camera 332, unless capture of an image is part of the trigger event. At block 408, the color extraction module 356 analyzes the one or more captured images to identify the object of interest and at block 410 the color extraction module 356 determines the predominant color of the object of interest in the one or more captured images. In instances whereby the trigger event includes an image capture, the color extraction module 356 can assume that the object of interest is present in the image, and is likely centered in the image or located within a target region of the image. In such instances, a search for the object within the image may not be necessary. In other embodiments, the trigger event may be based on an event other than an image capture of the object, and in such instances the color extraction module 356 may obtain multiple images of the local environment from different perspectives using the imaging camera 332 in case that the imaging camera 332 was not directed at the object of interest when the trigger event was detected. In this situation, the color extraction module 356 may utilize one or more object recognition processes to search for and identify the presence of the object within one or more of the captured images. Techniques for determining a predominant color of the object from an image are described below with reference to FIG. 5.

In one embodiment, the color extraction module 356 performs both the image analysis process and the color extraction process without remote support, while in other embodiments the color extraction module 356 outsources one or both of these processes to a remote processing system, such as an imaging analysis server 364 (FIG. 3) connected to the portable electronic device 100 over the Internet or other network 366 (FIG. 3) via the wireless interface 306 (FIG. 3). To illustrate, in response to the interest detection module 354 indicating a trigger event, the color extraction module 356 may capture one or more images 368 (FIG. 3) of the local environment and send the one or more images 368 to the imaging analysis server 364. The imaging analysis server 364 performs one or more object recognition processes to detect the presence of the object in the image 368, and so detected, determines a color associated with the object of interest from the image 368 and sends a color indicator 370 (FIG. 3) to the color extraction module 356 via the network 366. To facilitate identification of the object in the image 368, the color extraction module 356 further may transmit an object identifier (not shown), such as a name or other descriptor of the object, to the imaging analysis server 364 for use in identifying the object for search purposes.

With the predominant color so identified, at block 412 the color scheme configuration module 358 uses color information specified by the color extraction module 356 to customize one or more color schemes of the portable electronic device 100 or the case accessory 333 based on the predominant color. In some embodiments, this customization includes implementing a housing LED configuration 371 (FIG. 3) that controls the diffused light source 325 (FIG. 3) mounted in the housing of the portable electronic device 100 via the LED controller 346 (FIG. 3) so as to emit diffused light approximating the predominant color. The color scheme customization also can include implementing an accessory LED configuration 372 (FIG. 3) whereby the color scheme configuration module 358 wirelessly communicates with the case accessory 333 (FIG. 3) via the wireless PAN interface 326 (FIG. 3) to control the light source 330 (FIG. 3) of the case accessory 333 to emit light approximating the color associated with the object. As another example, the color scheme customization additionally can include implementing a GUI color scheme configuration 373 (FIG. 3) whereby the color scheme configuration module 358 configures a color scheme of a GUI of a software application or the OS of the portable electronic device 100 to incorporate the color as one of the primary colors or accent colors of the color scheme of the GUI.

Further, as noted above, the portable electronic device 100 may be a member of a group of portable electronic devices intending to have a coordinated color scheme. In such instances, at block 414 the color scheme configuration module 358 can communicate color coordination information (including the predominant color information) with other portable electronic devices via the wireless interfaces 306 and 326 so that the other portable electronic devices of the group can configure one or more of their light sources to emit light approximating the predominant color in the manner described above.

FIG. 5 illustrates an example method for implementing the color extraction process of block 410 of method 400 of FIG. 4 in accordance with at least one embodiment. This method is described in the example context of the color scheme controller 352 of the portable device 100 of FIG. 3. The depicted method initiates following the image capture and analysis process of block 408 of method 400 using a captured image. The captured image may be the result of a user's instruction to capture the image or as one or more images automatically captured by the portable electronic device 100 in response to implied interest in an object in the local environment.

At block 502, the color extraction module 356 determines the manner by which an object is represented in the captured image: as a detected object with a known boundary in the captured image; as likely present in a target window in the captured image; or as in an undetermined location within the captured image. In the event that the boundary of the object within the captured image is known through object recognition analysis by the color extraction module 356 or the imaging analysis server 364, at block 504 the color extraction module 356 (or the imaging analysis server 364) can determine the predominant color of the object based on the color of the pixels of the image within this boundary. To illustrate, the color extraction module 356 can determine a mean or median pixel color of the pixels within the boundary as the predominant color.

In the event that the object is determined to be present in a target region of the captured image (such as a central region of the captured image when it is assumed that the user centered the object in a viewfinder when taking the image), at block 506 the color extraction module 356 or imaging analysis server 364 determines the predominant color of the object based on the color of the pixels in this target region. As with the example above, this predominant color can include a median or mean of the colors of the pixels within this target region. In the event that it is not assumed that the object is present in a specified target region, at block 508 the color extraction module 356 or imaging analysis server 364 may assume that the object of interest constitutes a large portion of the captured image and thus determine the predominant color of the object based on the pixels of the entirety of the captured image, such as by determining the predominant color as the mean or median of colors of every pixel in the captured image.

With the predominant color so determined, the process returns to block 412 of method 400 with the customization of one or more color schemes of the portable electronic device 100 or related case accessory based on the predominant color as described above.

Much of the inventive functionality and many of the inventive principles described above are well suited for implementation with or in software programs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs minimal experimentation. Therefore, in the interest of brevity and minimization of any risk of obscuring the principles and concepts according to the present disclosure, further discussion of such software, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   obtaining, at a portable electronic device, an image of an object that is in proximity to the portable electronic device responsive to an indication of an interest in the object;
   determining, by a processor, from the image, a predominant color associated with the object; and
   controlling, via the portable electronic device, a diffused light source integrated with the portable electronic device to emit light approximating the predominant color associated with the object, the diffused light source configured to customize a color scheme of a graphical user interface of the portable electronic device.

2. The method of claim 1, wherein the indication of the interest in the object comprises an explicit instruction to capture the image of the object.

3. The method of claim 2, wherein the explicit instruction comprises at least one of: a manipulation of an imaging application of the portable electronic device; and a voice command to the portable electronic device.

4. The method of claim 3, wherein the manipulation of the imaging application includes a manipulation of a button of the imaging application for capture of the image.

5. The method of claim 1, wherein the indication of the interest in the object comprises an inference of interest in the object based on monitoring of actions performed at the portable electronic device.

6. The method of claim 5, wherein the monitoring of actions comprises monitoring vocalizations to detect the inference of interest in the object.

7. The method of claim 1, wherein obtaining the image of the object comprises at least one of:
   capturing the image using an imaging camera integrated in the portable electronic device; and
   capturing the image using an imaging camera external to the portable electronic device.

8. The method of claim 1, wherein determining the predominant color associated with the object includes at least one of:
   determining a predominant color of the image;
   determining a predominant color of a target region of the image; and
   determining a predominant color of a portion of the image that represents the object within the image.

9. The method of claim 1, wherein obtaining the image of the object includes identifying a presence of the object in the image through object recognition processing of imagery captured by a camera associated with the portable electronic device.

10. The method of claim 1, wherein determining the predominant color associated with the object comprises:
    transmitting the image from the portable electronic device to a remote processing system including the processor; and
    receiving, at the portable electronic device an indicator of the predominant color associated with the object from the remote processing system.

11. The method of claim 1, wherein the diffused light source comprises at least one of:
    a display screen;
    a diffused light source disposed at a housing of the portable electronic device; and
    a diffused light source disposed at a case accessory associated with the portable electronic device.

12. The method of claim 1, further comprising:
transmitting an indicator of the predominant color associated with the object from the portable electronic device to another portable electronic device.

13. A system comprising:
a portable electronic device including:
a camera interface coupleable to an imaging camera;
a diffused light source interface coupleable to a diffused light source, the diffused light source including a plurality of light emitting elements, each light emitting element emitting light having a different dominant wavelength, and at least one diffuser overlying the plurality of light emitting elements; and
a color scheme controller to obtain an image of an object via the imaging camera responsive to an indication of an interest in the object, and to control, via the diffused light source interface, the diffused light source to emit light approximating a predominant color associated with the object by controlling a corresponding signal supplied to each light emitting element to achieve a blend of emitted light approximating the predominant color associated with the object.

14. The system of claim 13, wherein the diffused light source includes at least one of:
a display;
a diffused light source disposed at a housing of the portable electronic device; and
a diffused light source disposed at a case accessory associated with the portable electronic device.

15. The system of claim 13, wherein:
the portable electronic device comprises a display screen; and
the color scheme controller is further configured to control a color theme of a graphical user interface presented via the display screen to have at least one of a primary color and an accent color approximating the predominant color associated with the object.

16. The system of claim 13, wherein the imaging camera is external to the portable electronic device and is wirelessly coupled to the camera interface.

17. The system of claim 13, wherein the portable electronic device further includes:
an interest detection module to monitor vocalizations for inferences of interest in objects.

18. The system of claim 13, wherein the portable electronic device further includes:
a wireless interface to transmit the image to a remote processing system and to receive an indicator of the predominant color associated with the object from the remote processing system.

19. The system of claim 13, wherein the predominant color associated with the object is one of a mean color or a median color associated with the object.

20. The method of claim 1, wherein the color scheme of the portable electronic device includes at least one of a primary color and an accent color approximating the predominant color associated with the object.

21. The system of claim 13, wherein the color scheme controller is further configured to determine the predominant color of the image, determine the predominant color of a target region of the image, or determine the predominant color of a portion of the image that represents the object within the image.

22. The system of claim 13, wherein the color scheme controller is further configured to transmit an indicator of the predominant color associated with the object from the portable electronic device to another portable electronic device.

* * * * *